April 20, 1926.
J. K. RUTHS
STEAM PLANT
Filed May 21, 1918
1,581,229
2 Sheets-Sheet 2
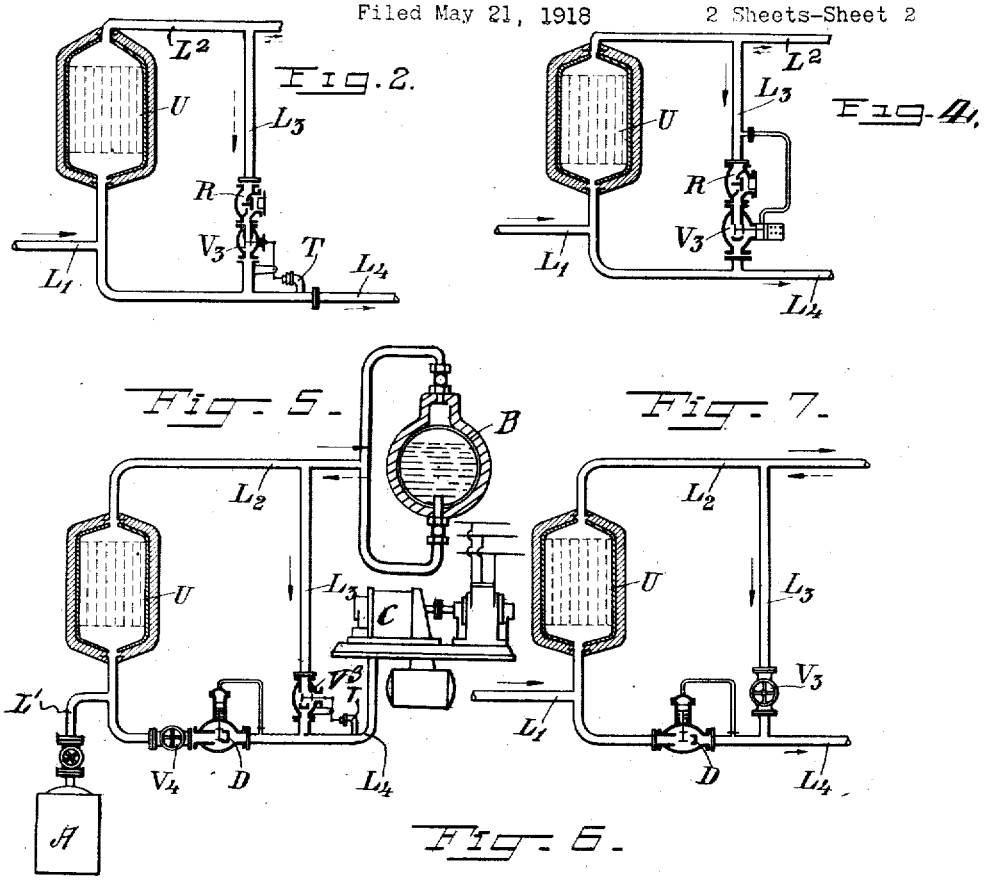
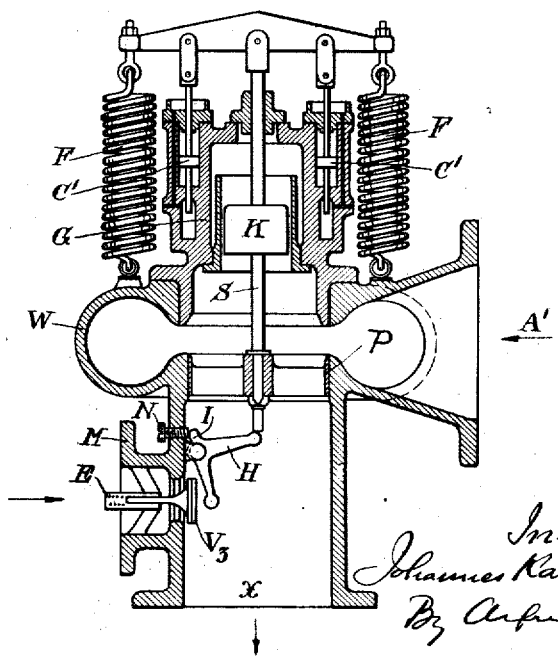
Inventor:
Johannes Karl Ruths Patented Apr. 20, 1926.

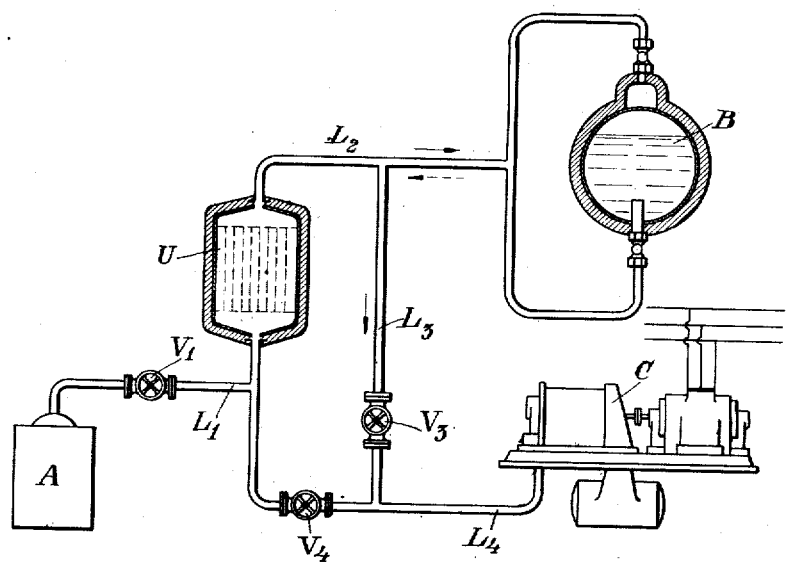
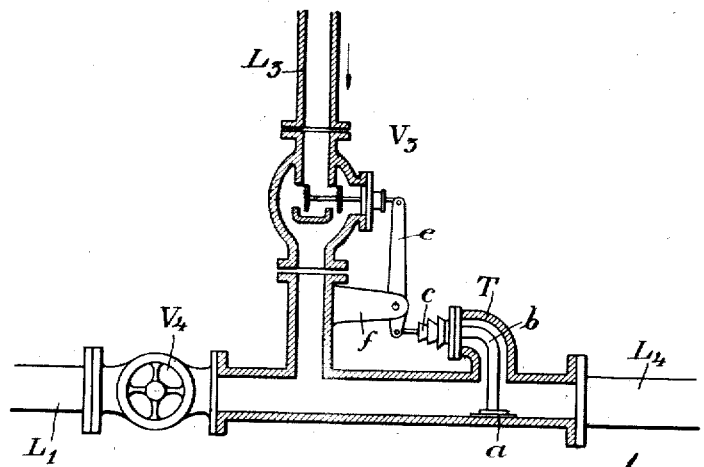

1,581,229

UNITED STATES PATENT OFFICE.

JOHANNES KARL RUTHS, OF DJURSHOLM, SWEDEN, ASSIGNOR TO AKTIEBOLAGET VAPORACKUMULATOR, OF STOCKHOLM, SWEDEN.

STEAM PLANT.

Application filed May 21, 1918. Serial No. 235,894.

(GRANTED UNDER THE PROVISIONS OF THE ACT OF MARCH 3, 1921, 41 STAT. L., 1313.)

To all whom it may concern:

Be it known that I, JOHANNES KARL RUTHS, a subject of the King of Sweden, residing in Djursholm, Sweden, have invented certain new and useful Improvements in Steam Plants, for which I have made application for patent in Sweden on May 5, 1917, Patent 58248; in Norway on January 1, 1919; in Finland on September 7, 1918; in Germany on June 1, 1917; in Poland on April 1, 1920; in Czechoslovakia on December 31, 1919; in Spain on July 2, 1919; in Holland on April 22, 1918; and in Japan on August 4, 1919; and I do hereby declare the following to be a full, clear, and exact description of the invention, such as will enable others skilled in the art to which it appertains to make and use the same.

My invention relates to steam plants equipped with steam accumulators and with heat storing means for the heat of superheat such as disclosed in my prior Patent No. 1,294,714. In the arrangement shown in the said prior patent, the temperature of steam passing from the accumulator during a discharge and through the heat storing means for the heat of superheat, which may be termed a superheat storer, gradually falls due to the reduction in temperature of the heat absorbing and heat rejecting material in the superheat storer.

In many cases, this variation of temperature is immaterial aside from the fact that the temperature of the superheated steam at the beginning of the discharge of the steam accumulator is often too high, while at the end of the discharge, the temperature of the superheated steam may be too low.

The object of my present invention is to avoid either partly or entirely such variations in the temperature of the superheated steam, and below several embodiments of my invention are described.

My invention comprises the arrangement of a by-pass to the superheat storer, through which a portion of the steam taken from the accumulator can flow as saturated or wet steam from the accumulator without passing through the superheat storer. This steam is mixed with the superheated steam coming from the superheat storer, and by this mixture of the two qualities of steam the desired temperature of the superheated steam is obtained.

My invention further comprises automatic means for controlling the temperature of the mixture of superheated and saturated steam.

In the accompanying drawings, in which some forms of my invention are diagrammaticaly illustrated, Fig. 1 shows a plant having a hand-operated valve disposed in the by-pass conduit to the superheat storer. Fig. 2 shows a similar plant having the valve disposed in the by-pass conduit operated automatically in response to temperature. Fig. 3 shows, on an enlarged scale, means for automaticaly operating the temperature responsive valve of Fig. 2. Fig. 4 shows a plant having the valve disposed in the by-pass conduit controlled by the pressure in the pipings or in the accumulator. Fig. 5 shows a plant similar to that of Fig. 2 but having a pressure-reducing valve inserted in the discharge conduit for the superheat storer so as to obtain a constant pressure in said conduit. Fig. 6 shows in section details of a pressure operated valve. Fig. 7 shows a plant similar to that of Fig. 1 but having a pressure-reducing valve inserted in the discharge conduit.

Referring more particular to Fig. 1, a source of superheated steam A, which may comprise any type of steam generator, supplies steam to a conduit $L_1$ controlled by valve $V_1$. A superheat storer U which consists of a receptacle containing heat storing material is connected to receive steam from conduit $L_1$ and to deliver steam to accumulator B through conduit $L_2$. A steam consumer C, shown as a turbine, receives steam from conduit $L_4$ which has communication with conduit $L_1$ through valve $V_4$. A by-pass connection $L_3$ connects conduit $L_2$ with conduit $L_4$ and is controlled by a valve $V_3$, shown in this embodiment as a hand operated valve.

Assume that valves $V_3$ and $V_4$ are closed. Steam then passes from generator A, through conduit $L_1$, superheat storer U, conduit $L_2$ and into accumulator B. Now assume that turbine C is to be supplied with steam. Valve $V_4$ is opened and valve $V_1$ is closed. Steam then passes from accumulator B through superheat storer U and into conduit $L_4$ and to the turbine.

To regulate the temperature of the steam passing to the turbine, valve $V_3$ is opened and adjusted in accordance with the temperature of steam supplied through valve $V_4$. To illustrate the operation assume that the accumulator is fully charged. It will be readily understood that the temperature of the heat storing material in the heat storing device U is higher with a higher pressure in the accumulator since charging of the accumulator increases its pressure and raises the temperature of the heat storing material. When, therefore, steam passes from the accumulator in charged condition, the temperature of steam leaving the storer U is of relatively high value. Valve $V_3$ is then adjusted so that it has a relatively large opening and a relatively large quantity of steam flows through connection $L_3$ and mixes with the superheated steam thus reducing the temperature of the latter.

As the accumulator discharges, heat is gradually absorbed by the steam from the superheat storer and the temperature of the heat storing material gradually falls, so that the temperature of the superheated steam falls and a progressively decreasing opening of valve $V_3$ is necessary for the maintenance of a given temperature of steam supplied to turbine C.

To automatically maintain a given temperature in conduit $L_4$ a thermostatic regulator may be arranged to control valve $V_3$ in response to temperature in conduit $L_4$. Such an arrangement is shown in Fig. 3, in which $b$ designates a small pipe inserted in conduit $L_4$, and having communication with a small receptacle $a$. A bellows $c$ has communication with pipe $b$. Pipe $b$, receptacle $a$ and bellows $c$ are hollow and contain an expansible liquid such as mercury. Bellows $c$ is connected to one end of a lever $e$ pivoted on a bracket $f$ at a point intermediate its ends. The other end of lever $e$ is connected to the valve stem of valve $V_3$.

On increase of temperature in conduit $L_4$, mercury in $a$, $b$ and $c$ expands and rocks lever $e$ in clockwise direction whereby valve $V_3$ is opened farther and a greater quantity of the cooling agent, the saturated steam, passes through connection $L_3$ and into conduit $L_4$ returning the temperature to normal.

The arrangement shown in Fig. 1 is best adaptable to use when steam is wanted periodically as, for example, when the turbine is a reserve unit, the accumulator being wholly charged at one time and wholly discharged at another. Where steam is consumed continuously as where turbine C is in continuous operation for a substantial period and charging and discharging of the accumulator take place continuously, I prefer an arrangement such as shown in Fig. 2 in which valve $V_4$ is omitted and a non-return valve R is inserted in the by-pass $L_3$.

The steam enters as before through the conduit $L_1$. If this steam can momentarily not be used, it will pass through the superheat storer U and enter the accumulator B shown in Fig. 1, the non-return valve R preventing any portion of this steam from directly entering the accumulator, because, in that case, the heat of superheat of the steam flowing past the superheat storer direct to the accumulator would be lost.

When the consumption of discharge steam is greater than the quantity of charge steam, the difference will be supplied by the accumulator B, the steam flowing through the superheat storer U and the by-pass pipe $L_3$. The distribution of the two qualities of steam is effected by the valve $V_3$ which is controlled by the thermostat T.

Fig. 4 shows an arrangement similar to that of Fig. 2 but modified in that valve $V_3$, instead of being controlled by a thermostat, is controlled by a pressure regulator responsive to the pressure in the accumulator. As previously pointed out there is a more or less definite relation between the pressure in the accumulator, the heat stored in the superheat storer, the temperature of steam leaving the superheat storer and consequently the amount of steam necessary to be by-passed to give a constant temperature to the final steam for use. A large opening of valve $V_3$ is necessary when the pressure in the accumulator is high and a small opening when the pressure is low. A control in accordance with accumulator pressure as illustrated in Fig. 4 is thus possible. Rise of pressure in the accumulator increases the valve opening.

Fig. 5 shows modification of the arrangement shown in Fig. 1 wherein a thermostat controls valve $V_3$ and a reducing valve D is arranged in the path of steam from the superheat storer. The reducing valve operates to maintain a constant pressure in conduit $L_4$. The operation will be obvious from the above descriptions of preceding figures.

In certain cases the valve $V_3$ may be controlled by the reducing valve so that it is open during the greater part of the time of discharge of the accumulator and closes when the pressure in piping $L_4$ falls.

When the pressure of the accumulator B during the charge is again increased, the valve $V_3$ will be held closed by the spring-load of the pressure-reducing valve. This pressure-reducing valve and the valve $V_3$ may in such a case be arranged in one and the same valve-casing.

Such an embodiment is illustrated in Fig. 6.

G indicates the valve-casing and A' the piping leading from the superheat storer U. The steam enters an annular space W. Conduit $L_4$ supplying steam to a consumer is connected with opening X. The regulating member consists of a hollow cylinder P which by means of a spindle S is connected to a regulating piston K. The latter is controlled by springs F, and its movements are cushioned by means of plungers C'.

The valve $V_3$ is inserted in the side of the valve-casing G. When the piping $L_4$ is closed and therefore there is no pressure in opening X the valve $V_3$ is subjected to the full pressure of the springs F by means of the spindle S and the bell crank lever H. By this means the valve $V_3$ even at increasing pressure in the accomulator B is closed as long as the valve $V_4$, which is in the piping connected to A', is closed. As soon however, as valve $V_4$ is opened, a pressure exists in the space under the piston K causing the piston to rise, which movement, by means of the spindle S, is also transmitted to the hollow cylinder P. The valve $V_3$ is thereby released, so that the spring E can now open the valve $V_3$. This opening operation is assigned by the pressure in the piping $L_3$, which is connected to the flanged socket M.

A tail-piece I on the bell crank lever H limits the opening of the valve $V_3$. In connection with this tail-piece, a set-screw N, is provided whereby the quantity of steam flowing through the piping $L_3$, can be exactly regulated.

Because of such a limitation of the opening of the valve $V_3$, the movement of the piston K and of the hollow cylinder P will not be influenced by steam-pressure in the piping $L_3$, which pressure alternates highly. The springs F move the hollow cylinder P so that the pressure in the opening X and therefore also in the conduit $L_4$ will be constant, the movement being such that upward movement of piston K and cylinder P reduces the size of the opening from A' to X. After the pressure in the conduit $L_4$ at the end of the discharge has fallen sufficiently, the valve $V_3$ is again closed by the springs F.

Another arrangement is illustrated in Fig. 7. As in Figs. 2 and 4, the discharge-piping $L_4$ is continually subjected to pressure, which is maintained constant by the pressure-reducing valve D. The non-return valve R in Figs. 2 and 4 is in this case omitted, the pressure in the piping $L_4$ being always lower than the pressure of the accumulator B. The valve $V_3$ can in this case, for the same reason as in Fig. 1, be an ordinary stop valve and yet regulate the temperature of the steam.

What I claim is:

1. Steam accumulator apparatus for steam plants comprising, in combination, a steam generator, a steam conduit connected therewith, a receptacle connected to said conduit, an accumulator connected with said receptacle, means in said receptacle to store the heat of superheat of steam passing from said generator through said receptacle to said accumulator and to superheat steam passing from said accumulator through said receptacle, a steam consumer, means to lead superheated steam from said receptacle toward said consumer, means to withdraw saturated steam from the accumulator and mix the same with the superheated steam and means to lead the mixture of saturated and superheated steam to the consumer.

2. Steam accumulator apparatus for steam plants comprising, in combination, a source of superheated steam, a device for storing and giving up the heat of superheat, an accumulator, a consumer, means to lead steam from said source through said device to said accumulator, means to lead steam from said accumulator through said device to said consumer, by-pass means to lead steam from said accumulator to the consumer and means for controlling the relative amount of steam passing through and by-passing said device.

3. Steam accumulator apparatus for steam plants comprising, in combination, a source of superheated steam, a device for storing and giving up the heat of superheat of said superheated steam, an accumulator, a consumer, a conduit connecting said device with said accumulator, a conduit connecting said device with said consumer, a by-pass connection for steam between said conduits, and automatic temperature responsive means to control the flow of steam through said by-pass connection.

4. Steam accumulator apparatus for steam plants comprising, in combination, a source of superheated steam, a receptacle adapted to receive steam from said source, an accumulator, a connection between said receptacle and said accumulator, a consumer, a connection between said receptacle and said consumer, means associated with said receptacle to store the heat of superheat of steam passing from said source through said receptacle to said accumulator and to superheat steam passing from said accumulator through said receptacle to said consumer, a by-pass connection to afford communication between said afore-mentioned connections, and automatic means in said by-pass connection to decrease the flow of steam through said by-pass connection as the pressure in the accumulator decreases.

5. Steam accumulator apparatus for steam plants comprising, in combination, a source of superheated steam, a device adapted to receive steam from said source, an accumulator, a connection between said device and said accumulator, a consumer, a conduit connecting said device with said consumer, means associated with said device to store the heat of superheat of steam passing from said source through said device to said accumulator and to superheat steam passing from said accumulator through said device to said consumer, a by-pass connection to afford communication between said aforementioned connection and said conduit, and means to control the passage of steam through said by-pass connection to maintain a constant temperature in said conduit.

6. Steam accumulator apparatus for steam plants comprising, in combination, a source of superheated steam, a device adapted to receive steam from said source, an accumulator, a connection between said device and said accumulator, a consumer, a conduit connecting said device with said consumer, means associated with said device to store the heat of superheat of steam passing from said source through said device to said accumulator and to superheat steam passing from said accumulator through said device to said consumer, a by-pass connection to afford communication between said aforementioned connection and said conduit, a thermostat in said conduit, a valve in said by-pass connection, said valve being actuated by said thermostat.

7. Steam accumulator apparatus for steam plants comprising, in combination, a source of superheated steam, a device adapted to receive steam from said source, an accumulator, a connection between said device and said accumulator, a consumer, a conduit connecting said device with said consumer, means associated with said device to store the heat of superheat of steam passing from said source through said device to said accumulator and to superheat steam passing from said accumulator through said device to said consumer, a reducing valve in said conduit, a by-pass connection to afford communication between said aforementioned connection and said conduit, a valve in said by-pass connection, and means to control said valve actuated by the temperature in said conduit between said reducing valve and said consumer.

8. Steam accumulator apparatus for steam plants comprising, in combination, a source of superheated steam, a device adapted to receive steam from said source, an accumulator, a consumer, means associated with said device to store the heat of superheat of steam, means to conduct steam from said source through said device to said accumulator, means to conduct steam from said accumulator through said device toward said consumer, means to supply saturated steam to steam superheated by passing through said device and mix the same, automatic means to regulate the relative amount of saturated and superheated steam mixed and operating to control the temperature of the mixture and means to conduct the mixture to the consumer.

In testimony whereof I affixed my signature.

JOHANNES KARL RUTHS.

the heat of superheat of steam passing from said source through said device to said accumulator and to superheat steam passing from said accumulator through said device to said consumer, a by-pass connection to afford communication between said aforementioned connection and said conduit, and means to control the passage of steam through said by-pass connection to maintain a constant temperature in said conduit.

6. Steam accumulator apparatus for steam plants comprising, in combination, a source of superheated steam, a device adapted to receive steam from said source, an accumulator, a connection between said device and said accumulator, a consumer, a conduit connecting said device with said consumer, means associated with said device to store the heat of superheat of steam passing from said source through said device to said accumulator and to superheat steam passing from said accumulator through said device to said consumer, a by-pass connection to afford communication between said aforementioned connection and said conduit, a thermostat in said conduit, a valve in said by-pass connection, said valve being actuated by said thermostat.

7. Steam accumulator apparatus for steam plants comprising, in combination, a source of superheated steam, a device adapted to receive steam from said source, an accumulator, a connection between said device and said accumulator, a consumer, a conduit connecting said device with said consumer, means associated with said device to store the heat of superheat of steam passing from said source through said device to said accumulator and to superheat steam passing from said accumulator through said device to said consumer, a reducing valve in said conduit, a by-pass connection to afford communication between said aforementioned connection and said conduit, a valve in said by-pass connection, and means to control said valve actuated by the temperature in said conduit between said reducing valve and said consumer.

8. Steam accumulator apparatus for steam plants comprising, in combination, a source of superheated steam, a device adapted to receive steam from said source, an accumulator, a consumer, means associated with said device to store the heat of superheat of steam, means to conduct steam from said source through said device to said accumulator, means to conduct steam from said accumulator through said device toward said consumer, means to supply saturated steam to steam superheated by passing through said device and mix the same, automatic means to regulate the relative amount of saturated and superheated steam mixed and operating to control the temperature of the mixture and means to conduct the mixture to the consumer.

In testimony whereof I affixed my signature.

JOHANNES KARL RUTHS.

Certificate of Correction.

It is hereby certified that in Letters Patent No. 1,581,229, granted April 20, 1926, upon the application of Johannes Karl Ruths, of Djursholm, Sweden, for an improvement in "Steam Plants," an error appears in the printed specification requiring correction as follows: Page 3, line 26, for the word "assigned" read *assisted;* and that the said Letters Patent should be read with this correction therein that the same may conform to the record of the case in the Patent Office.

Signed and sealed this 22d day of June, A. D. 1926.

[SEAL.]
M. J. MOORE,
*Acting Commissioner of Patents.*

Certificate of Correction.

It is hereby certified that in Letters Patent No. 1,581,229, granted April 20, 1926, upon the application of Johannes Karl Ruths, of Djursholm, Sweden, for an improvement in "Steam Plants," an error appears in the printed specification requiring correction as follows: Page 3, line 26, for the word "assigned" read *assisted;* and that the said Letters Patent should be read with this correction therein that the same may conform to the record of the case in the Patent Office.

Signed and sealed this 22d day of June, A. D. 1926.

[SEAL.]

M. J. MOORE,
*Acting Commissioner of Patents.*